(12) United States Patent
Courson et al.

(10) Patent No.: US 6,431,508 B1
(45) Date of Patent: Aug. 13, 2002

(54) ADAPTABLE AND UNIVERSAL SYSTEM FOR ATTACHMENTS

(75) Inventors: Billy F. Courson; Ray S. Baggett, both of Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/706,548

(22) Filed: Nov. 6, 2000

(51) Int. Cl.[7] .................................................. A47G 1/17
(52) U.S. Cl. .............................. 248/205.3; 248/222.52; 248/328; 248/493
(58) Field of Search ................................ 248/693, 690, 248/222.52, 205.3, 205.4, 492, 493, 498, 206.5, 328; 403/275

(56) References Cited

U.S. PATENT DOCUMENTS

| | | | | |
|---|---|---|---|---|
| 1,838,935 A | * | 12/1931 | Fixsen | |
| 2,308,771 A | * | 1/1943 | Mooney | |
| 2,626,773 A | * | 1/1953 | Backman | |
| 3,124,385 A | * | 3/1964 | Neptune | |
| 3,129,751 A | * | 4/1964 | Weber | |
| 3,408,771 A | * | 11/1968 | Garrett et al. | |
| 3,575,371 A | * | 4/1971 | Carlstedt | |
| 4,145,939 A | * | 3/1979 | Garrison | |
| D268,300 S | * | 3/1983 | Richards | |
| 4,821,994 A | * | 4/1989 | Fricker | |
| 4,863,135 A | * | 9/1989 | Mellor et al. | |
| 5,195,248 A | * | 3/1993 | Juhasz | |
| 5,573,383 A | * | 11/1996 | Uemura et al. | |
| 6,102,607 A | * | 8/2000 | Kintscher | |
| 6,187,404 B1 | * | 2/2001 | Schumann | |

* cited by examiner

Primary Examiner—Korie Chan
(74) Attorney, Agent, or Firm—Harvey A. Gilbert; Donald G. Peck

(57) ABSTRACT

An interface system supports a load from a surface. A disc-shaped base member is adapted to be secured to a supporting surface. A flexible member has one portion secured to the base member and another portion extends from the base member in a flexible loop to attach and support a tensile load. A cavity in the base member faces an inner surface thereof and contains an adhesive to secure the one portion of the flexible member, and an opening in the center of the base member extends from the cavity to the outer surface to pass the load-bearing flexible loop from the center of the base member and provide a flexible attachment for the tensile load in the center of the base member.

10 Claims, 4 Drawing Sheets

ADAPTABLE AND UNIVERSAL SYSTEM FOR ATTACHMENTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to interfaces affixed to supporting structure for attaching and supporting a load. More particularly, the interface of this invention uses flexible loops extending from a base member to reduce failure inducing bending and torsional moments.

Many different ways have evolved to attach a wide assortment of things to various structures. Typically, devices for attachment have included the use of adhesives, magnets, vacuum systems, bindings of rope/line/straps, and a myriad of mechanisms. The problems associated with making a reliable means to support a load from a supporting structure are further complicated when such devices are to function in the corrosive and dynamic marine environment above and under the water. One attachment system currently being used is a padeye kit used to attach bulk explosives to structure underwater. This kit includes a two-part adhesive system for bonding a disc-shaped base to a supporting surface, and a hard-eye extends essentially at right angles from the base to make attachments through rope, line, or clips.

This design has worked well for some applications, but for others, torsional and bending failure modes were noted in the adhesive layer. These were due to the large stress concentrations attributed to bending and torsional moments created by supporting loads from the rigid hard-eye that perpendicularly extended from the base.

Thus, in accordance with this inventive concept, a need has been recognized in the state of the art for a mount that permits quick attachment of an object to a supporting surface and reduces bending and torsional moments, or stresses when loaded.

SUMMARY OF THE INVENTION

The present invention provides an interface system that supports a load from a surface. A base member is adapted to be secured to a supporting surface. A flexible member has one portion secured to the base member and another portion extends from the base member in a flexible loop to attach and support a tensile load. The flexible loop bends to align with the tensile load. Optionally, the base member is adapted to interlock with mating structure on a package extending from the base member.

An object of the invention is to provide an interface system that reduces stresses where it is joined to its supporting surface.

Another object of the invention is to provide an interface system having a flexible loop fixed in a base member to bear external loads.

Another object of the invention is to provide an interface system having a flexible loop that reduces torsional and bending moments attributed to loading.

Another object is to provide an interface system having a flexible loop that conforms to, or aligns with the direction of a load.

Another object of the invention is to provide an interface system having a flexible loop that provides for quick attachment of tensile loads and reduces bending moments.

An object of the invention is to provide an interface system having a flexible loop for the attachment of line or other tensile load in the center of a base member to result in less stress, or torsional moments on the joint (bonded or other) between the base member and a supporting surface.

Another object is to provide an interface system having increased loading capability due to removal or reduction of torsional and bending moments.

Another object of the invention is to provide an interface system capable of using different ways to mount a base member onto a supporting surface including, but not limited to, locking an outer edge of the base member onto mating structure on a supporting surface, mating magnetic components on the base member and supporting surface, interposing adhesives between the base member and supporting surface, applying a vacuum between the base member and supporting surface, using mechanical aids, such as nailing and/or screwing the base member and supporting surface together, etc.

Another object of the invention is to provide an interface system having a flexible loop that lays down during the attachment of other types of attachments/devices of a load to reduce or eliminate an adapter or other means that would otherwise be required to account for protrusion of a rigid padeye.

Another object is to provide an interface system having a flexible loop in its center that lays flat to allow bonding to be effected through application of a vacuum and/or other adhesive curing procedure.

Another object of the invention is to provide an interface system having a base member of different thicknesses and sizes depending on the requirements of attachment to a supporting surface.

Another object of the invention is to provide an interface system having a base member adapted to interlock with mating structure on a package extending from the base member.

Another object of the invention is to provide an interface system having an edge design that fits into mating twist-lock structure on a supporting surface.

Another object of the invention is to provide an interface system having different fixations of flexible loops in a base member including, but not limited to, doubling back the material of the flexible loop in an adhesive in a cavity in the base member to carry more load.

Another object is to provide an interface system having a flexible loop of different sizes made from a variety of flexible materials.

Another object is to provide an interface system having different flexibility in the flexible loop and different materials in the base member to accommodate different load requirements.

These and other objects of the invention will become more readily apparent from the ensuing specification when taken in conjunction with the appended claims.

DESCRIPTION OF THE PREFERRED EMBODIMENT

Figure 1:
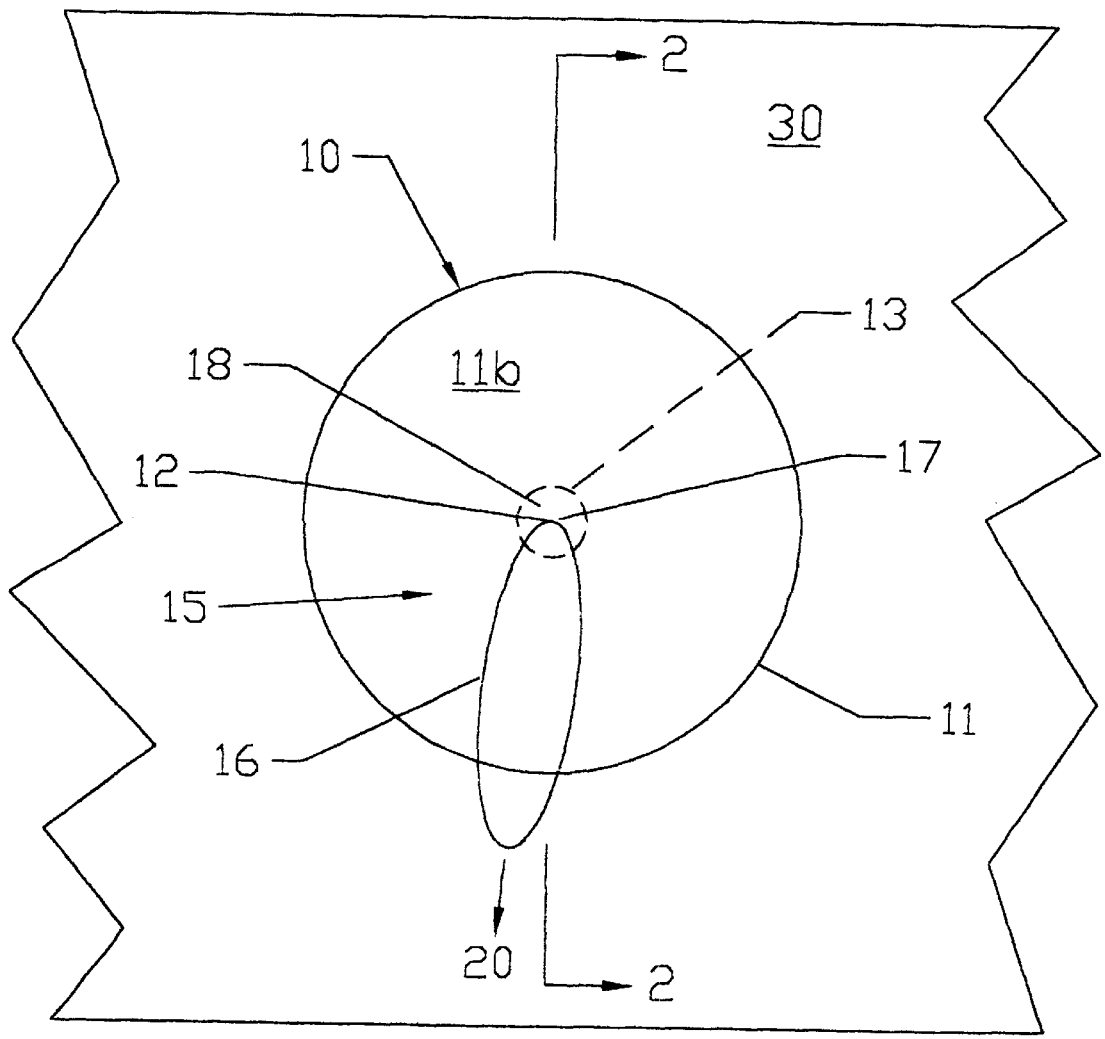
FIG. 1 is a front view of a base member and flexible loop of the interface system of this invention mounted on a supporting surface.
Figure 2:
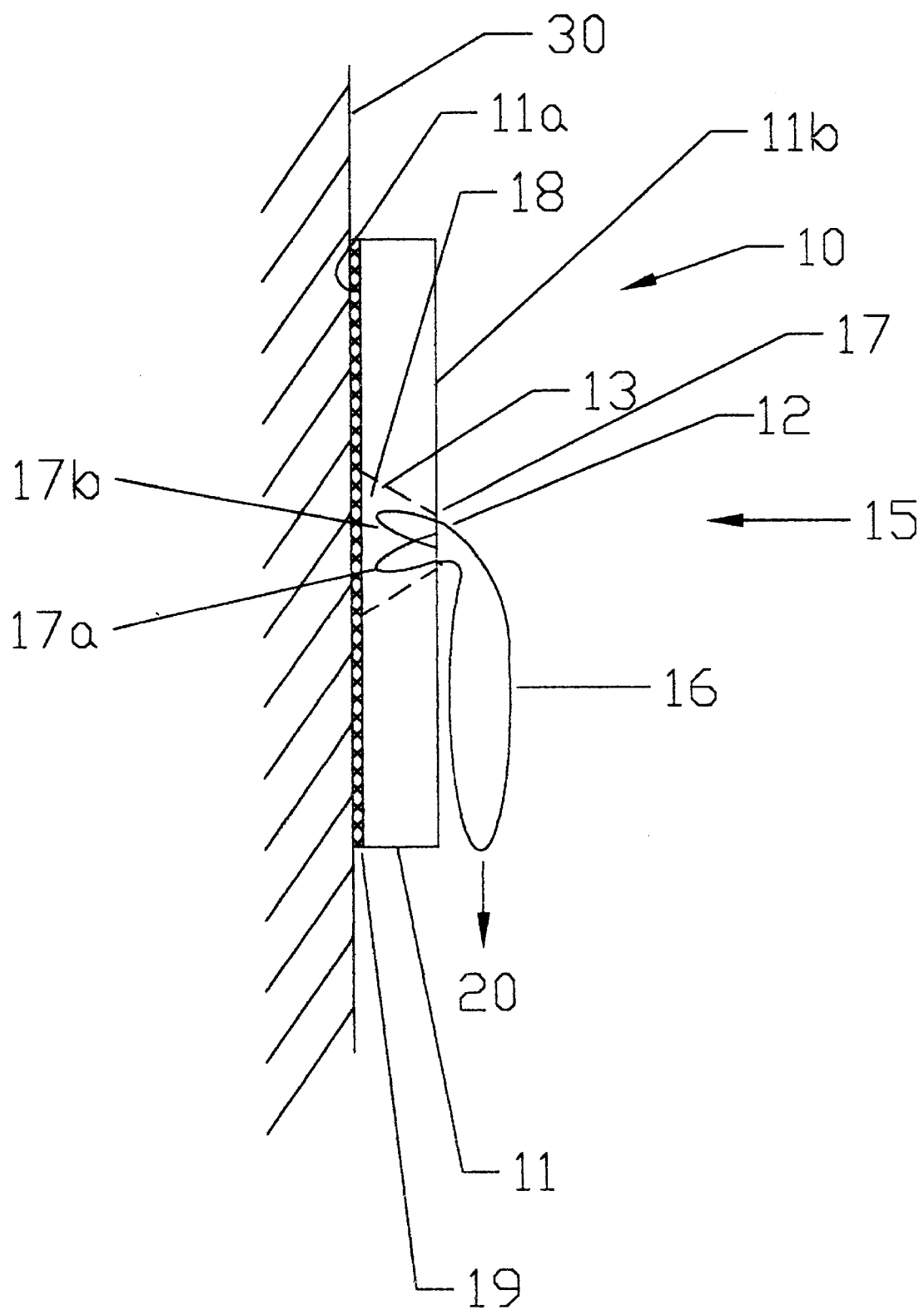
FIG. 2 is a cross-sectional side view of the interface system taken generally along line 2—2 in FIG. 1 and showing the flexible loop lying-down across the base member in the direction of an applied load.

Referring to FIGS. 1 and 2, interface system 10 of this invention is designed to avoid the creation of failure inducing torsional and bending moments as it supports a load 20 (shown as arrow 20) from a supporting surface 30. Load 20 is depicted as being exerted in an essentially downward direction, and supporting surface 30 is a vertical wall or other vertically extending structural member. Interface system 10 can be applied to successfully bear the burden of many different loads including, but not limited to instrumentation packages, ordnance, anchoring points, towing, or supporting forces, etc. In addition, interface system 10 can secure such loads to different supporting surfaces 30 including, but not limited to inclined, overhanging, upward facing, etc. and can secure such loads in other hemispherical orientations from these surfaces than the downward direction shown.

Interface system 10 includes a base member 11 provided with an opening 12 at its center. Base member 11 is flat and has a flat inner surface 11a to lie adjacent to supporting surface 30. Base member 11 is shown as disc-shaped, but it can have other shapes, such as square, rectangular, elliptical, etc. that can vary in size depending on the magnitude of load 20.

The flat shape of base member 11 helps avoid generation of bending moments, but it has sufficient thickness to define an essentially cone-shaped recess, or cavity 13 extending from inner surface 11a to opening 12. Many different materials can be used for fabrication of base member 11 provided they are sufficiently rigid and strong enough to bear load 20 and are compatible to be affixed to supporting surface 30. Typically, base member 11 can be made of metal (that may be magnetic), plastic, polycarbonate, acrylic, wood, fiberglass, glass, rubber, ceramic, flexible materials, etc. Base member 11 can be transparent in order to permit transmission of radiation (light) that may be used to cure photo curable adhesives 18 and 19 when such adhesives are selected. Interface system 10 has a flexible member 15 that extends through opening 12 of base member 11. Flexible member 15 has a loop portion 16 that extends above outer surface 11b of base member 11 and an inner portion 17 that extends through opening 12 and inside cavity 13 of base member 11. Loop portion 16 can be larger or smaller and can be selected to have different flexibility depending on load 20 and what is required to successfully complete a task. Attaching load 20 to loop portion 16 can be done in numerous well-known ways, such as tying it with another loop, using interlocking pin structure, attaching clips, clamping with screw structures and/or bands, applying hooks-and-loops, etc.

The materials of flexible member 15 can be a number of different materials, including wire, coated wire, plastic strips, monofilament, small cables, small straps made of natural fibers such as linen or silk, manmade lines such as nylon, and other combinations of materials. Whatever material is selected for fabrication of flexible member 15, it must have sufficient tensile strength to bear load 20 and be sufficiently flexible and tough to not chafe and break as it is flexed during support and management of load 20.

Inner portion 17 includes both of opposite ends 17a and 17b of flexible member 15. Ends 17a and 17b of inner portion 17 extend through opening 12 and into cavity 13 of base member 11. Inside of cavity 13, ends 17a and 17b may be folded back on themselves one or more times, or the ends may be knotted on themselves or wrapped about an embedded pin, for examples. Optionally, ends 17a and 17b may also further extend from cavity 13 a short distance along inner surface 11a.

An adhesive 18 substantially fills the remainder of cavity 13 and cures to engage, or bond to the inner walls of cavity 13 and ends 17a and 17b. The folded back parts of ends 17a and 17b prevents them from being pulled out of adhesive 18 and cavity 13 when loop portion 16 is supporting load 20. A suitable adhesive 18 may be selected from a wide variety of commercially available bonding agents which make a strong bond and are sufficiently tough to withstand the flexure and possibly changing loadings created by load 20 in it's ambient. The amount of flexibility in the center of base member 11 where opening 12 permits passage of flexible loop portion 16 can vary from very flexible to somewhat rigid, depending on application needs. Having flexible loop portion 16 coming from opening 12 in the center of flat base member 11 and lying along surface 11b reduces generation of both bending and torsional moments when load 20 is supported by flexible member 15.

Flexible member 15 is thusly secured to base member 11 which can be secured to supporting surface 30 by an adhesive layer 19. Adhesive layer 19 is interposed between inner surface 11a of base member 11 and supporting surface 30, which preferably has been cleaned, and cures to engage, or bond base member 11 and supporting surface 30 together. When ends 17a and 17b of flexible inner portion 17 further extend from cavity 13 a short distance along inner surface 11a, adhesive 19 engages them to further secure flexible member 15 in interface system 10. Adhesive 19 can be any of many proven commercially available bonding agents having sufficient strength to bear the bending and shear loadings created by load 20 in its environment.

Different means for securing base member 11 to supporting surface 30 may be used to supplement or replace adhesive 19. These include but are not limited to: screws, nails, studs, clamps and other mechanisms engaging base member 11 and supporting surface 30 to hold them together. In addition, inner surface 11a of base member 11 could be concave and a vacuum pump could be attached to a suitable fitting to use the force created by an applied vacuum to hold them together, or mutually attracting magnets, or magnetic surfaces could be applied to base member 11 and supporting surface 30 to hold them together, etc.

Figure 3:
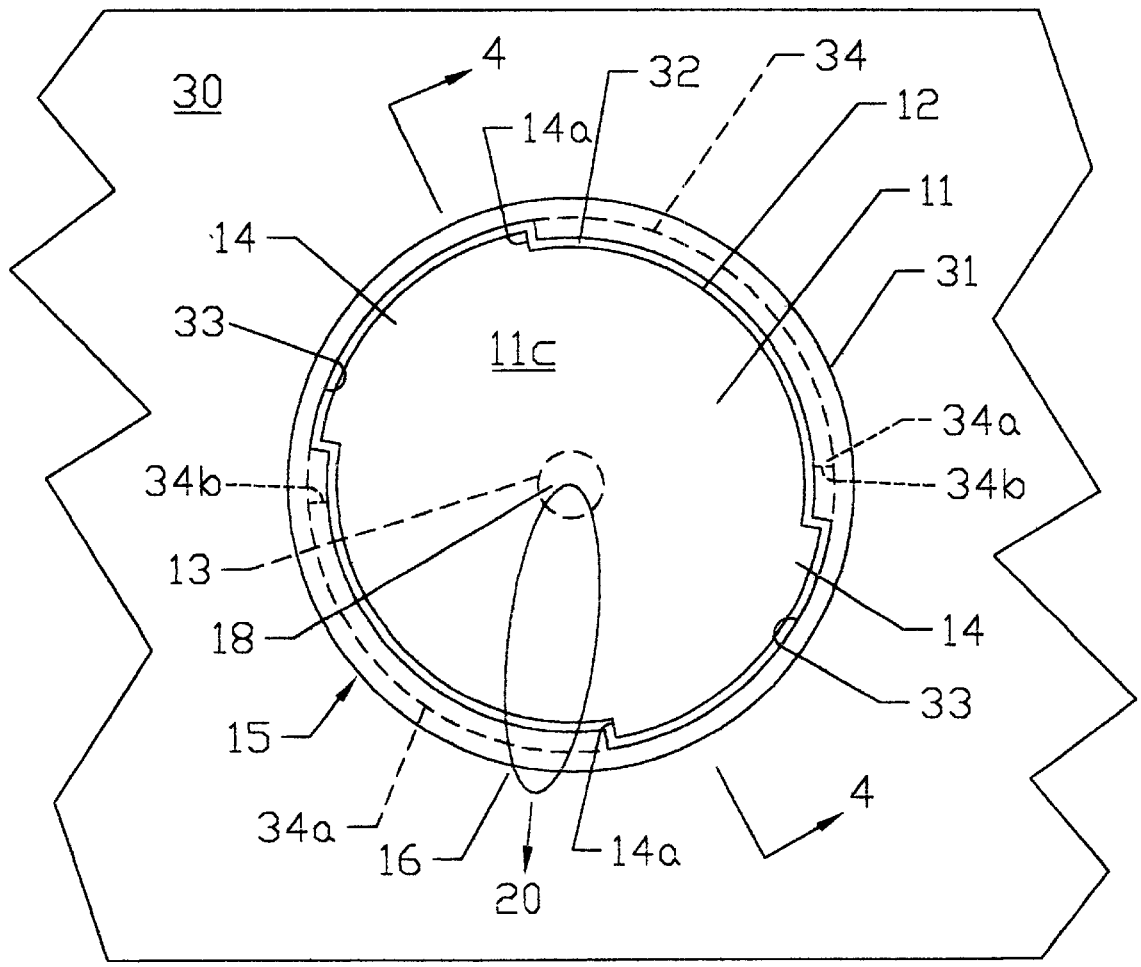
FIG. 3 is a front view of a cross section of another embodiment of the interface system of this invention taken generally along lines 3—3 in FIG. 4 showing radially extending portions of the base member being inserted in arc-shaped openings in mating twist-lock structure mounted on a package. Structure for interlocking the extending portions and mating twist-lock structure has not been obscured by deleting cross-hatching of mating twist-lock structure.
Figure 4:
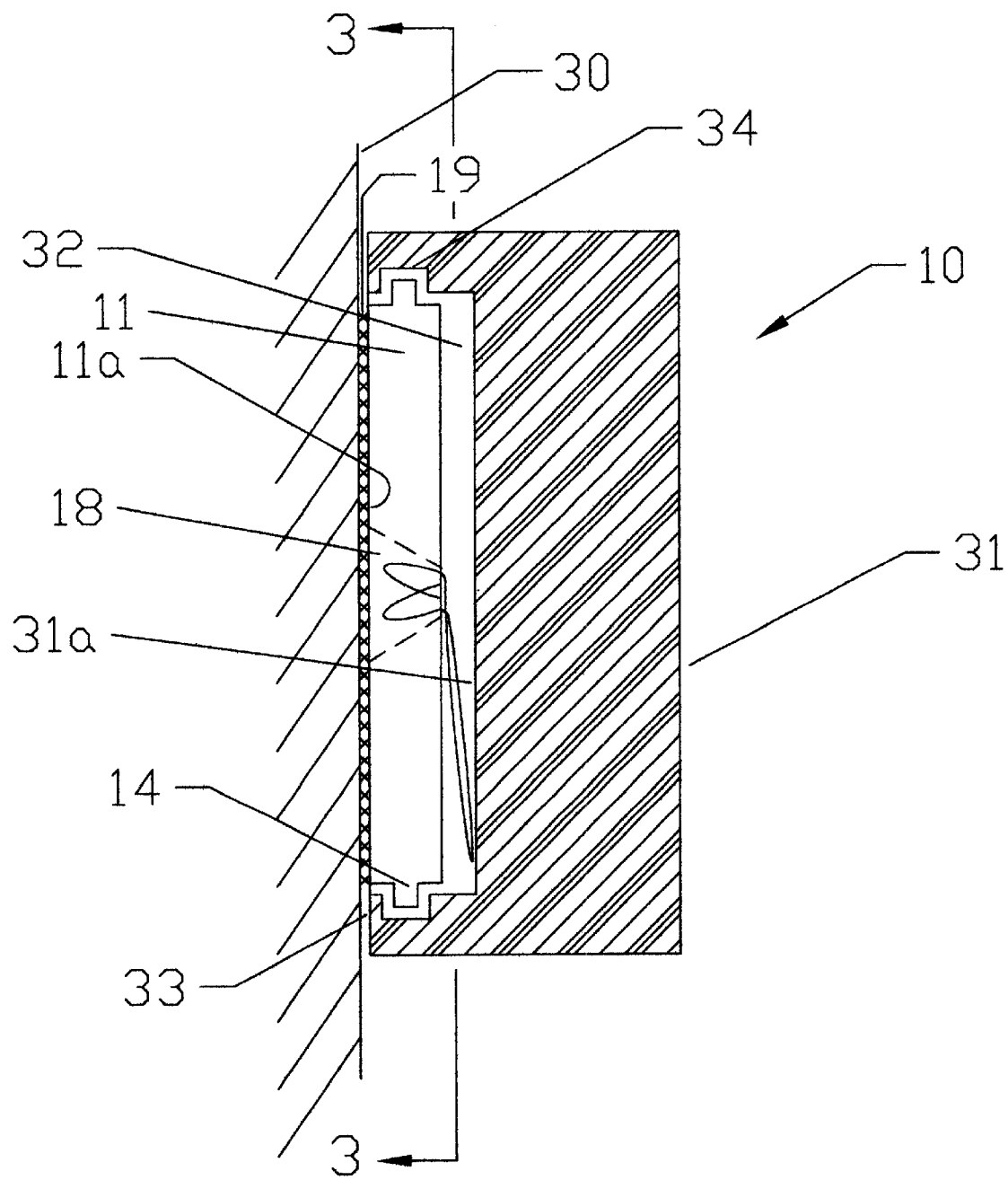
FIG. 4 is a cross-sectional side view taken generally along line 4—4 in FIG. 3 showing engagement of surfaces of the radially extending portions by surfaces of the mating twist-lock structure.

FIGS. 3 and 4 show another embodiment of interface system 10 that has base member 11 attached to flexible member 15 and securely bonded to supporting surface 30 in essentially the same way as described above. However, base member 11 is further provided with a pair of radially extending portions 14 that extend from central part 11c of base member 11.

Mating twist-lock structure 31 is adapted to be securely mounted on supporting surface 30 via base member 11 and radially extending portions 14. A pair of arc-shaped openings 33 extend radially outwardly from central aperture 32 of mating twist-lock structure 31. Central aperture 32 and arc-shaped openings 33 are sized to respectively receive central part 11c and radially extending portions 14 through them as central part 11c and radially extending portions 14 are inserted into them.

After central part 11c and radially extending portions 14 of base member 11 have been inserted through central aperture 32 and arc-shaped openings 33 in mating twist-lock structure 31, base member 11 is rotated about ninety degrees clockwise. This rotation displaces radially extending portions 14 in slot 34 in mating twist-lock structure 31.

Slot 34 may be a single continuous annular slot that circumferentially extends around central aperture 32 from arc-shaped openings 33. Rotation of radially extending portions 14 in slot 34 causes surfaces of radially extending portions 14 to frictionally engage the surfaces of slot 34 in mating twist-lock structure 31 and prevent base member 11 from being pulled from it. Radially extending portions 14 and/or slot 34 may also be tapered in cross section to increase frictional engagement of surfaces of radially extending portions 14 and surfaces of slot 34 as radially extending portions 14 are being further rotated into slot 34.

Slot 34 need not extend about central aperture 32 for three hundred sixty degrees, but could only extend for about ninety degrees, for example, in a pair of essentially coplanar arc-shaped sections 34a of slot 34 in mating twist-lock structure 31. Arc-shaped sections 34a of slot 34 are disposed to receive radially extending portions 14 through arc-shaped openings 33. Arc-shaped sections 34a allow partial rotation of portions 14 for about ninety degrees, for example, until ends 14a of portions 14 abut ends 34b of sections 34a of slot 34, and they are frictionally retained within mating twist-lock structure 31.

The arrangement of FIGS. 3 and 4 give users the option of attaching packages via the flexible loops 16 and/or twist-lock structure 31. Of course, base member 16 may be made without loop 16 and could be attached to surface 30 with adhesive 19 and twist-lock structure 31 could be twist-locked to it. But the cost of having every base member 11 provided with flexible loop 16 is so little, it might be better to standardize all interface systems 10 to have flexible loop 16 and have this added capability when used with mating twist-lock structure 31. FIG. 3 shows flexible loop 16 extending through the spaces between the interlocking surfaces of portions 14 and structure 31 to be able to support load 20, and FIG. 4 shows flexible loop 16 not being used and folded out-of-the-way in aperture 32.

Interface system 10 in accordance with this invention is a common means for allowing attachment of various types of loads 20 and quickly provides for such attachment through the use of adhesives, vacuum, studs, magnets or any other applicable mechanism that provides means for attachment to an object, and/or surface, such as supporting surface 30. Interface system 10 accommodates the mounting of bulk charges, shaped charges, sensors, and other types of systems to objects or surfaces underwater, in moist/dirty/oily/dry conditions or any other type of condition imaginable. Interface system 10 of this invention may be independent of the particular type of bonding or other mechanism with which it is attached to supporting surface 30, and has inherent ease in adaptability and superior performance over preexisting systems. Base member 11 can have its outer edge designed a number of ways to accommodate other types of attachments to supporting surface 30, including variations that can be locked onto outer edges with interfaces that mate to the padeye base member.

Interface system 10 includes a flexible loop portion 16 that not only provides for quick attachment, but also reduces stresses in the it bonded joint to a supporting surface 30 by removing bending and torsional and moment loading that is typically a limitation in contemporary hard-eye attachment systems. Consequently, flexible loop portion 16 of interface system 10 is capable of carrying more load due to the removal or reduction of stress concentrations otherwise caused by torsional and bending moments in previous designs of padeyes. Flexible loop portion 16 is able to do this because attachment of inner portion 17 in adhesive 18 in cavity 13 and through opening 12 in the center of base member 11 results in less stress in a bonded joint of adhesive 19.

Flexible loop portion 16 of interface system 10 will lay down adjacent to surface 11b during the attachment of other types of loads 20. This reduces or eliminates the need for an adapter, or other accommodation of the protrusion of a rigid padeye of a well-known contemporary mounting fixture. Having flexible loop portion 16 in the center of base member 11 and laying flat allows a bonding mechanism between base member 11 and supporting surface 30 to be implemented through the use of ancillary equipment, e.g., a vacuum device or an adhesive curing device (a radiation source to cure an adhesive). Interlocking base member 11 bonded having extensions 14 onto surface 30 via adhesive 19 can engage mating interlocking structure 31 to support packages (not shown) that may be molded or otherwise contained in structure 31. This gives users of this technology a rapid means of attaching, removing, and reattaching the original or other packages of electronics, ordnance, sensor, etc., to an undersea surface without attracting undue attention.

Having the teachings of this invention in mind, modifications and alternate embodiments of this invention may be adapted. Interface system 10 can be in different sizes, and base member 11 and flexible member 15 can be different materials chosen to assure long term reliable operation in different operational scenarios. Thus, interface system 10 is designed for use under water, on land, and in outer space where it may be exposed to mixes of the dynamic effects of water and wind, extremes of heat and cold, and exposure to intense sunlight, for examples.

The disclosed components and their arrangements as disclosed herein all contribute to the novel features of this invention. Interface system 10 provides a quick and cost-effective way to support loads without introducing unnecessary complications or creating burdensome weight and size constraints. Therefore, interface system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. An interface system comprising:
   a base member adapted to be secured to a supporting surface; and
   a flexible member having opposite ends secured to said base member and an intermediate portion between said ends extending from said base member in a flexible loop to attach and support a tensile load, said flexible loop bending to align with said tensile load and reduce generation of bending and torsional moments, said base member having an inner surface adjacent said supporting surface and an outer surface having said flexible loop extending therethrough, said base member having a cavity extending to an opening, said cavity extending from said inner surface and containing an adhesive to secure said opposite ends of said flexible member therein, and said opening being disposed in said outer surface to pass said flexible loop therethrough, said base member being disc-shaped, and said inner surface being flat to lie adjacent said supporting surface, and said adhesive, said cavity, and said opening being in the center of said disc-shaped base member to extend the load bearing flexible member from the center of said base member.

2. An interface system according to claim 1 wherein said adhesive and said flexible loop provide a flexible attachment for said tensile load in the center of said base member.

3. An interface system according to claim 2 further comprising:
screws and optionally nails engaging said base member and said supporting surface to secure said base member and said supporting surface together.

4. An interface system according to claim 2 further comprising:
a bonding agent interposed between said inner surface and said supporting surface to secure said base member and said flexible member thereto.

5. An interface system according to claim 2 further comprising:
magnetic components on said inner surface and said supporting surface to secure said base member and said flexible member thereto.

6. An interface system according to claim 2 further comprising:
portions radially extending from said base member; and
mating twist lock structure having mating surfaces to interlock with said radially extending portions to secure said base member and said mating twist lock structure together.

7. An interface system according to claim 6 wherein said mating twist-lock structure has at least one circumferential slot to receive said radially extending portions to retain said base member therein.

8. An interface system according to claim 7 wherein said mating twist-lock structure is provided with a central aperture and arc-shaped openings sized to respectively receive a central part and said radially extending portions of said base member therethrough during insertion of said central part and said radially extending portions therein.

9. An interface system according to claim 8 wherein said slot receives said radially extending portions during rotation therein to cause surfaces of said radially extending portions of said base member to frictionally engage surfaces of said slot to prevent said base member from being pulled from said mating twist-lock structure.

10. An interface system according to claim 9 wherein said radially extending portions and said slot are tapered in cross sections to increase frictional engagement of surfaces of said radially extending portions and surfaces of said slot as said radially extending portions are rotated into said slot.

* * * * *